United States Patent
Mirza et al.

(10) Patent No.: US 12,359,980 B2
(45) Date of Patent: Jul. 15, 2025

(54) SYSTEMS AND METHODS FOR MONITORING FOOD TEMPERATURES

(71) Applicant: 7-Eleven, Inc., Irving, TX (US)

(72) Inventors: Shahmeer Ali Mirza, Celina, TX (US); Matthew O'Daniel Redmond, Denton, TX (US); John Robert Keller, Plano, TX (US)

(73) Assignee: 7-ELEVEN, INC., Irving, TX (US)

( * ) Notice: Subject to any disclaimer, the term of this patent is extended or adjusted under 35 U.S.C. 154(b) by 762 days.

(21) Appl. No.: 17/455,800

(22) Filed: Nov. 19, 2021

(65) Prior Publication Data

US 2023/0160753 A1 May 25, 2023

(51) Int. Cl.
*G01K 1/26* (2006.01)
*G01K 1/02* (2021.01)
*G01K 1/14* (2021.01)

(52) U.S. Cl.
CPC ............. *G01K 1/026* (2013.01); *G01K 1/14* (2013.01); *G01K 2207/04* (2013.01)

(58) Field of Classification Search
None
See application file for complete search history.

(56) References Cited

U.S. PATENT DOCUMENTS 10,060,798 B1 * 8/2018 Riscalla ............... G06Q 10/109
2016/0310049 A1 * 10/2016 Rowe .................. A61B 5/14517
2018/0255957 A1 * 9/2018 Wu ......................... A47J 27/004

* cited by examiner

*Primary Examiner* — Erica S Lin
(74) *Attorney, Agent, or Firm* — Baker Botts L.L.P.

(57) ABSTRACT

A system includes one or more memory units and a processor. The processor is configured to receive, from a food temperature probe, a first temperature associated with a first food item. The processor is further configured to receive, from the food temperature probe, a second temperature associated with a second food item. The processor is further configured to receive, from the food temperature probe, a third temperature that was measured by the food temperature probe after measuring the first temperature but before measuring the second temperature, the third temperature associated with a cleaning of the food temperature probe. The processor is further configured to send an alert for display on a user device when the third temperature is greater than the cleaning threshold temperature.

9 Claims, 2 Drawing Sheets

SYSTEMS AND METHODS FOR MONITORING FOOD TEMPERATURES

TECHNICAL FIELD

The present disclosure relates generally to sensors, and more specifically to systems and methods for monitoring food temperatures.

BACKGROUND

Food temperature probes are used frequently by food service providers to ensure that food items remain at safe temperatures before consumption. For example, employees in a convenience store may utilize a food temperature probe to periodically monitor the temperatures of convenience food items such as hot dogs. Food safety guidelines typically require that food items remain above certain minimum internal temperatures and that food temperature probes be properly cleaned between probing of different food types in order to avoid cross contamination.

SUMMARY

Food temperature probes are used frequently by food service providers to ensure that food items remain at safe temperatures before consumption. For example, employees in a convenience store may utilize a food temperature probe to periodically monitor the temperatures of convenience food items such as hot dogs. Food safety guidelines typically require that food items remain above certain minimum internal temperatures and that food temperature probes be properly cleaned between probing of different food types in order to avoid cross contamination.

This disclosure contemplates monitoring a food temperature probe and creating alerts for display on a user device based on temperatures reported by the food temperature probe. In one example, an alert may be displayed on a user device when a measured temperature of a certain food item is below a predetermined threshold temperature (e.g., a safe minimum internal temperature from food safety guidelines). In another example, an alert may be displayed on a user device when it is determined from reported temperatures that a food temperature probe was not properly cleaned between probing of different food types. In addition, certain embodiments automatically log temperatures measured by a food temperature probe, thereby reducing or eliminating altogether the manual logging of food temperatures by food handlers.

In some embodiments, a system includes one or more memory units and a processor. The processor is configured to receive, from a food temperature probe, a first temperature associated with a first food item. The processor is further configured to receive, from the food temperature probe, a second temperature associated with a second food item. The processor is further configured to receive, from the food temperature probe, a third temperature that was measured by the food temperature probe after measuring the first temperature but before measuring the second temperature, the third temperature associated with a cleaning of the food temperature probe. The processor is further configured to send an alert for display on a user device when the third temperature is greater than the cleaning threshold temperature.

The disclosed embodiments provide several practical applications and technical advantages, which include at least: 1) technology that utilizes a food temperature probe to measure and report temperatures of food items and temperatures associated with a cleaning of the food temperature probe; 2) technology that automatically provides alerts for display on a user device when a food temperature probe is not properly cleaned between the probing of two different food items; and 3) technology that automatically provides alerts for display on a user device when a food temperature probe measures a temperature of a food item that is below a minimum internal temperature according to food safety guidelines.

Certain embodiments may include none, some, or all of the above technical advantages and practical applications. One or more other technical advantages and practical applications may be readily apparent to one skilled in the art from the figures, descriptions, and claims included herein.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
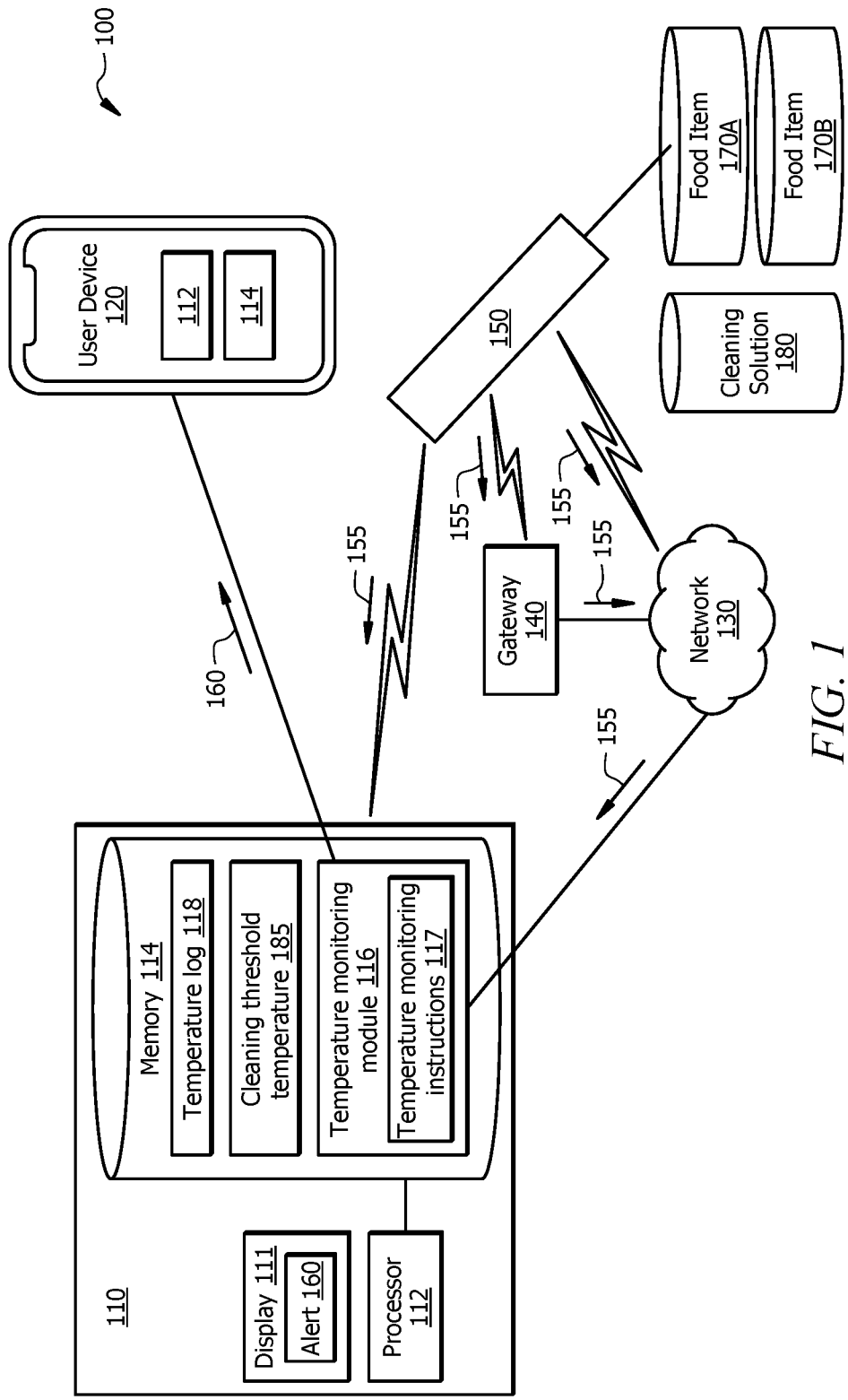
FIG. 1 is a schematic diagram of a food temperature monitoring system, according to certain embodiments.
Figure 2:
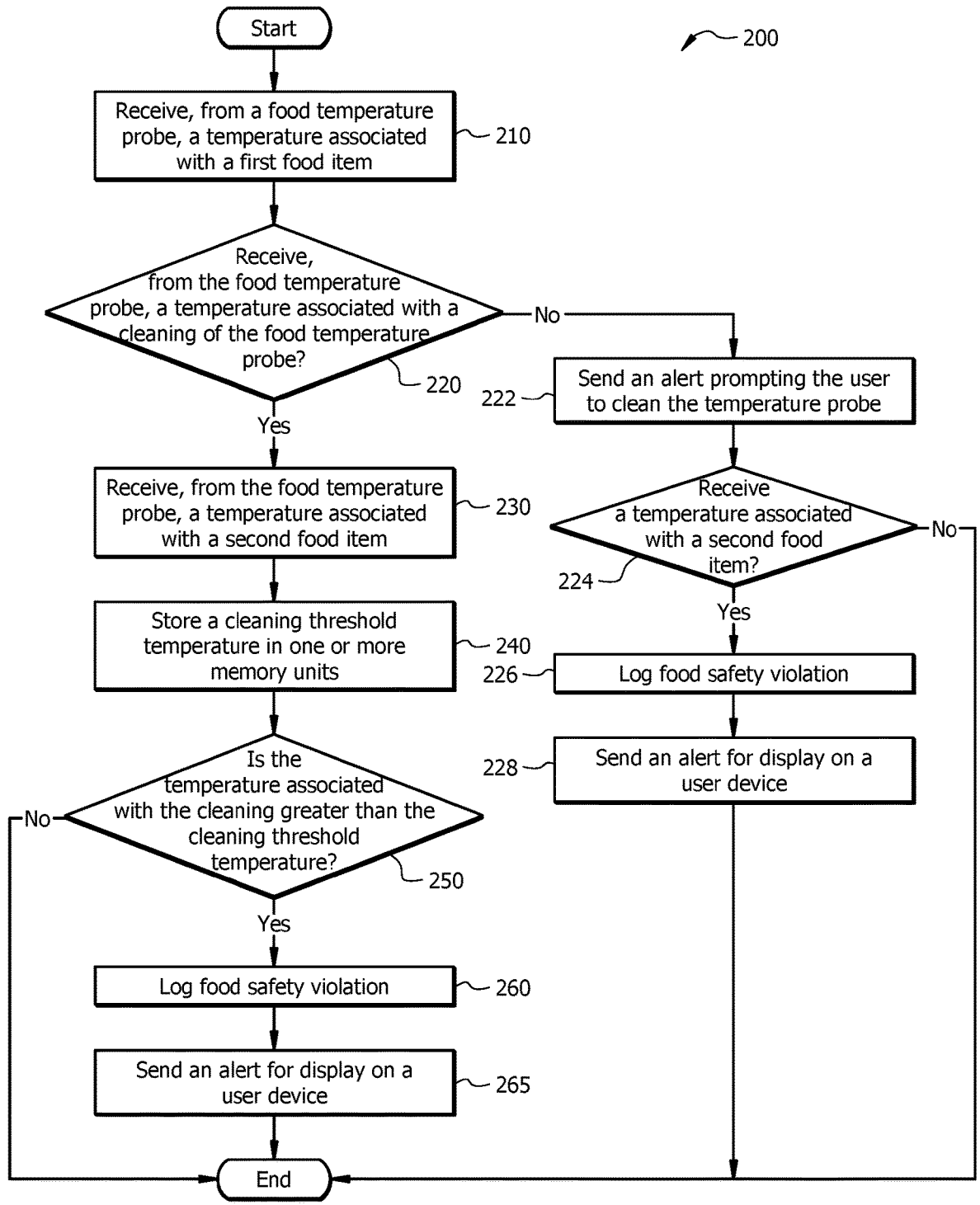
FIG. 2 is a flowchart of a method for monitoring the cleaning of a food temperature probe, according to certain embodiments.

Embodiments of the present disclosure and its advantages are best understood by referring to FIGS. 1 and 2 of the drawings, like numerals being used for like and corresponding parts of the various drawings.

Food temperature probes are used frequently by food service providers to ensure that food items remain at safe temperatures before consumption. For example, employees in a convenience store may utilize a food temperature probe to periodically monitor the temperatures of convenience food items such as hot dogs. Food safety guidelines typically require that food items remain above certain minimum internal temperatures and that food temperature probes be properly cleaned between probing of different food types in order to avoid cross contamination.

This disclosure contemplates monitoring a food temperature probe and creating alerts for display on a user device based on temperatures reported by the food temperature probe. In one example, an alert may be displayed on a user device when a measured temperature of a certain food item is below a predetermined threshold temperature (e.g., a minimum internal temperature required by food safety guidelines). In another example, an alert may be displayed on a user device when it is determined from reported temperatures that a food temperature probe was not properly cleaned between probing of two different food types. In addition, certain embodiments automatically log temperatures measured by a food temperature probe, thereby reducing or eliminating altogether the manual logging of food temperatures by food handlers.

FIG. 1 illustrates an example food temperature monitoring system 100, according to certain embodiments. As illustrated in FIG. 1, certain embodiments of food temperature monitoring system 100 include a computer system 110, a user device 120, a network 130, a gateway 140, and a food temperature probe 150. Computer system 110 is communicatively coupled to user device 120 and gateway 140 via a network 130 using any appropriate wired or wireless telecommunication technology. In some embodiments, food temperature probe 150 sends temperatures 155 directly to computer system 110 or indirectly to computer system 110 via network 130 using any appropriate wired or wireless telecommunication technology. In other embodiments, food temperature probe 150 sends temperatures 155 to gateway 140 using an Internet-of-Things (IoT) communications protocol, and gateway 140 in turn sends temperatures 155 via network 130. Temperatures 155 measured by food temperature probe 150 may be associated with food items 170 (e.g., food items 170A and 170B) or a cleaning solution 180.

In general, computer system 110 receives temperatures 155 that are generated by food temperature probe 150 and in turn provides alerts 160 for display on user device 120 or display 111 based on temperatures 155. In some embodiments, computer system 110 sends alert 160 for display on user device 120 or display 111 when a measured temperature 155 of a certain food item 170 is below a predetermined threshold temperature (e.g., a minimum internal temperature required by food safety guidelines). In some embodiments, computer system 110 sends alert 160 for display on user device 120 or display 111 when it is determined from temperature 155 that food temperature probe 150 was not properly cleaned between probing of different food items 170 (e.g., different types of food items 170). To reduce or eliminate altogether the manual logging of food temperatures by food handlers, computer system 110 stores temperatures 155 from food temperature probe 150 in a temperature log 118 and may send temperature log 118 for display on user device 120 or display 111.

Computer system 110 may be any appropriate computing system in any suitable physical form. As example and not by way of limitation, computer system 110 may be an embedded computer system, a system-on-chip (SOC), a single-board computer system (SBC) (such as, for example, a computer-on-module (COM) or system-on-module (SOM)), a desktop computer system, a laptop or notebook computer system, a mainframe, a mesh of computer systems, a mobile telephone, a personal digital assistant (PDA), a server, a tablet computer system, an augmented/virtual reality device, or a combination of two or more of these. Where appropriate, computer system 110 may include one or more computer systems 110; be unitary or distributed; span multiple locations; span multiple machines; span multiple data centers; or reside in a cloud, which may include one or more cloud components in one or more networks. Where appropriate, one or more computer systems 110 may perform without substantial spatial or temporal limitation one or more steps of one or more methods described or illustrated herein. As an example and not by way of limitation, one or more computer systems 110 may perform in real time or in batch mode one or more steps of one or more methods described or illustrated herein. One or more computer systems 110 may perform at different times or at different locations one or more steps of one or more methods described or illustrated herein, where appropriate. In some embodiments, computer system 110 includes an electronic display 111.

Computer system 110 may be physically located within the same physical building in which food temperature probe 150 is used, or physically located at a location remote from the physical building in which food temperature probe 150 is used. For example, in certain embodiments, computer system 110 may located in one or more remote servers (e.g. in the cloud).

Processor 112 is any electronic circuitry, including, but not limited to a microprocessor, an application specific integrated circuits (ASIC), an application specific instruction set processor (ASIP), and/or a state machine, that communicatively couples to memory 114 and controls the operation of computer system 110. Processor 112 may be 8-bit, 16-bit, 32-bit, 64-bit or of any other suitable architecture. Processor 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 112 may include other hardware that operates software to control and process information. Processor 112 executes software stored in memory to perform any of the functions described herein. Processor 112 controls the operation and administration of computer system 110 by processing information received from food temperature probe 150, gateway 140, network 130, user device 120, and memory 114. Processor 112 may be a programmable logic device, a microcontroller, a microprocessor, any suitable processing device, or any suitable combination of the preceding. Processor 112 is not limited to a single processing device and may encompass multiple processing devices.

Memory 114 may store, either permanently or temporarily, data such as sensor data 155, user preferences, business rules, operational software such as automatic alerting module 116, or other information for processor 112. Memory 114 may include any one or a combination of volatile or non-volatile local or remote devices suitable for storing information. For example, memory 114 may include random access memory (RAM), read only memory (ROM), magnetic storage devices, optical storage devices, or any other suitable information storage device or a combination of these devices.

Temperature monitoring module 116 represents any suitable set of instructions, logic, or code embodied in a computer-readable storage medium. For example, temperature monitoring module 116 may be embodied in memory 114, a disk, a CD, or a flash drive. In particular embodiments, temperature monitoring module 116 may include temperature monitoring instructions 117 (e.g., a software application) executable by processor 112 to perform one or more of the functions described herein. In general, temperature monitoring module 116 sends alert 160 for display on user device 120 either directly or via network 130. As described in more detail herein, alerts 160 are generated by temperature monitoring module 116 based on temperatures 155 from food temperature probe 150.

User device 120 is any appropriate device for communicating with components of computer system 110 over network 130. For example, user device 120 may be a handheld computing device such as a smartphone, wearable computer glasses, a smartwatch, a tablet computer, a laptop computer, and the like. User device 120 may include an electronic display such as display 111, a processor such as processor 112, and memory such as memory 114. The electronic display of user device 120 may display an alert 160 and temperature log 118 that is provided by computer system 110.

Network 130 allows communication between and amongst the various components of system 100. For example, computer system 110, user device 120, and gateway 140 may communicate via network 130. This disclosure contemplates network 130 being any suitable network operable to facilitate communication between the components of system 100. Network 130 may include any interconnecting system capable of transmitting audio, video, signals, data, messages, or any combination of the preceding. Network 130 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication (NFC) network, a Zigbee network, and/or any other suitable network.

Food temperature probe 150 is any appropriate device for sensing or measuring temperatures. For example, food temperature probe 150 may be a digital thermometer with a metal probe that is inserted into food items 170 in order to measure the temperatures of food items 170. In general, food temperature probe 150 provides temperatures 155 to computer system 110. Temperatures 155 may be any appropriate temperature measurement (e.g., Fahrenheit or Celsius), and in some embodiments may include a time stamp to indicate when a particular temperature 155 was measured.

In some embodiments, food temperature probe 150 is an IoT sensor. In general, IoT describes a network of physical objects that are embedded with sensors, software, and other technologies for the purpose of connecting and exchanging data with other devices and systems over the Internet, or any other appropriate network. For example, some embodiments of food temperature probe 150 include a microprocessor (e.g., processor 112), a transceiver (e.g., a Bluetooth transceiver) for wirelessly communicating temperature 155 (e.g., via an IoT communications protocol), an antenna, and a power supply such as a battery. In embodiments where food temperature probe 150 is an IoT device, food temperature monitoring system 100 may include gateway 140 for communicating with food temperature probe 150. Gateway 140 may be any appropriate IoT gateway, computer system, or electronic device that is capable of wirelessly communicating with food temperature probe 150 using any appropriate IoT communications protocol (e.g., Message Queuing Telemetry Transport (MQTT), Constrained Application Protocol (CoAP), Advanced Message Queuing Protocol (AMQP), Data Distribution Service (DDS), HyperText Transfer Protocol (HTTP), WiFi, Bluetooth, ZigBee, Z-Wave, a media access control (MAC) protocol such as LoRaWAN, and the like). For example, food temperature probe 150 may wirelessly transmit temperatures 155 to gateway 140, and gateway 140 may in turn send temperatures 155 to computer system 110 via network 130. In other embodiments, food temperature probe 150 is not an IoT device. In embodiments where food temperature probe 150 is not an IoT device, food temperature probe 150 does not utilize gateway 140 but instead transmits temperatures 155 directly to computer system 110 or indirectly via network 130 (e.g., via Bluetooth or WiFi).

Alert 160 is a message or other indication that is displayed on user device 120 or electronic display 111 regarding temperatures 155. In some embodiments, alert 160 includes one or more of an indication of food item 170, temperature 155 of food item 170, a minimum required temperature, a timestamp associated with temperature 155, and an indication of a food temperature violation. For example, when computer system 110 determines that temperature 155 of hot dogs 170 does not meet a minimum internal temperature associated with hot dogs 170 (e.g., temperature 155 is 130° F. and the minimum internal temperature of hot dogs 170 is 145° F.), alert 160 may be: "Food temperature violation on hot dogs at 10:20 AM: measured temperature=130° F.; required temperature=145° F." In some embodiments, alert 160 includes an indication of a cleaning violation of food temperature probe 150. For example, when computer system 110 determines that food temperature probe 150 was not properly cleaned between measuring a first food item 170A (e.g., hot dogs) and a second food item 170B (e.g., pizza), alert 160 may be: "The food temperature probe was not cleaned properly between probing the hot dogs and pizza." In this instance, if the food temperature probe 150 was not cleaned properly between probing two different types of food items 170, it can lead to cross-contamination and/or other adverse health and safety issues. In one example, cross-contamination of different types of food items can create problems with respect to allergens and food safety.

Food items 170 are any food whose temperatures are measured by food temperature probe 150 for food safety compliance. For example, food items 170 may be ready-to-eat convenience foods that are available for purchase in a convenience store. In some embodiments, a first food item 170A is a different type of food than a second food item 170B. For example, first food item 170A may be hot dogs and second food item 170B may be pizza. Each type of food item 170A may have a different minimum internal temperature according to food safety regulations. For example, first food item 170A may have a minimum internal temperature requirement of 130° F. while second food item 170B may have a minimum internal temperature requirement of 145° F.

Cleaning solution 180 is any compound, fluid, or chemical used to clean, sterilize or sanitize food temperature probe 150 in order to prevent cross-contamination and to kill bacteria and germs that may be present on food temperature probe 150. For example, cleaning solution 180 may be alcohol or a bleach/water solution. In some embodiments, a portion of food temperature probe 150 (e.g., a metal probe for contacting food items 170) is dipped into a container of cleaning solution 180 in order to clean food temperature probe 150. In other embodiments, cleaning solution 180 is applied to an applicator (e.g., a cloth or a wipe) that is then used to clean food temperature probe 150.

In general, cleaning solution 180, once applied to food temperature probe 150, will cause the temperature measured by food temperature probe 150 to drop, thereby allowing computer system 110 to determine if food temperature probe 150 was properly cleaned. As a specific example, consider a certain type of cleaning solution 180 such as alcohol that is known from prior testing to cause food temperature probe 150 to measure a temperature of 50° F. when the alcohol is applied to food temperature probe 150. Using this data, computer system 110 can determine whether food temperature probe 150 was cleaned properly between the probing of two different food items 170 by analyzing temperatures measured by food temperature probe 150 between the two different food items 170. If food temperature probe 150 measures a temperature below 50° F. between the probing of two different food items 170, computer system 110 can determine that temperature probe 150 was cleaned properly. If, however, food temperature probe 150 does not measure a temperature below 50° F. between the probing of two different food items 170, computer system 110 can determine that temperature probe 150 was not cleaned properly or was not cleaned at all.

In the above example, the temperatures measured by food temperature probe 150 between the probing of two different food items 170 are compared to a known temperature that is associated with the particular cleaning solution 180 (e.g., 50° F. in the above example) in order to determine whether food temperature probe 150 was cleaned properly. In other embodiments, instead of setting the preset threshold to be a known temperature associated with cleaning solution 180 (e.g., 50° F.), the preset threshold may be set to a certain amount of temperature drop below the measured temperature 155 of first food item 170A (e.g., an absolute drop in temperature of 80° F. from the measured temperature 155 of first food item 170A followed by a measured temperature 155 of second food item 170B). For example, if the measured temperature 155 of first food item 170A is 140° F. and the preset threshold is set to a drop of 80° F. from the measured temperature 155 of first food item 170A (i.e., 140° F.−80° F.=60° F. for the preset threshold), computer system 110 can determine that temperature probe 150 was not cleaned properly or was not cleaned at all if food temperature probe 150 does not measure a temperature below 60° F. between the probing of two different food items 170.

In yet other embodiments, instead of setting the preset threshold temperature to be a fixed, known temperature associated with cleaning solution 180 (e.g., 50° F.) as described above, the temperatures measured between the probing of two different food items 170 are analyzed to see if the measured temperatures dropped at a fast enough rate (e.g., a rate of temperature drop of 3° F. or more per second for at least three seconds after the measured temperature 155 of first food item 170A followed by a measured temperature 155 of second food item 170B). In general, cleaning solution 180 will cause a rapid fall in the temperatures measured by temperature probe 150. The fall in temperatures measured by temperature probe 150 due to cleaning solution 180 will be greater than any fall in temperatures caused by ambient air on temperature probe 150. As a specific example, consider a certain type of cleaning solution 180 such as alcohol that is known from prior testing to cause food temperature probe 150 to measure a rate of temperature drop of 3° F. per second for at least three seconds when the alcohol is properly applied to food temperature probe 150. Using this fact, computer system 100 may determine that temperature probe 150 was cleaned properly if food temperature probe 150 measures a temperature drop of 3° F. or more per second for at least three seconds between the probing of two different food items 170. If, however, food temperature probe 150 does not measure a temperature drop of 3° F. per second for at least three seconds between the probing of two different food items 170, computer system 110 can determine that temperature probe 150 was not cleaned properly or was not cleaned at all.

Cleaning threshold temperature 185 is a temperature stored in memory 114 that is used by some embodiments of computer system 110 to determine whether food temperature probe 150 was cleaned properly between probing two different food items 170. In some embodiments, cleaning threshold temperature 185 is a static, preset value. For example, the preset value may be a known temperature associated with cleaning solution 180 being applied to food temperature probe 150 (e.g., 50° F.). In some embodiments, cleaning threshold temperature 185 is a temperature that is a predetermined amount of temperature drop (e.g., 80 degrees) below temperature 155 of a first food item 170, as described above. For example, if the measured temperature 155 of a first food item 170 is 140° F., cleaning threshold temperature 185 may be set to 60° F.

In operation, computer system 110 analyzes temperatures 155 that are generated by food temperature probe 150 and provides alerts 160 for display on user device 120 or electronic display 111 based on temperatures 155. Generally, computer system 110 generates alerts 160 in response to two situations: 1) when a measured temperature 155 of a certain food item 170 is below a predetermined threshold temperature (e.g., a minimum internal temperature required by food safety guidelines), and 2) when computer system 110 determines from temperatures 155 that food temperature probe 150 was not properly cleaned between probing of different food items 170. Each situation is described in more detail below.

First, certain embodiments generate alert 160 for display on user device 120 or electronic display 111 when a measured temperature 155 of a certain food item 170 is below a predetermined threshold temperature. In some embodiments, the predetermined threshold temperature may be a preset static value such as 140° F. In other embodiments, the predetermined threshold temperature may be dynamically set based on the type of food item 170. In general, each type of food time 170 has an associated minimum internal temperature required by food safety guidelines. For example, beef has a minimum internal temperature of 145° F. while poultry has a minimum internal temperature of 165° F. To dynamically set the predetermined threshold temperature, computer system 110 may determine the type of food item 170 based on user input (e.g., beef hot dogs), determine the associated minimum internal temperature of the determined food type (e.g., by consulting food safety guidelines stored in memory), and then set the predetermined threshold temperature to the associated minimum internal temperature of the determined food type. Once the predetermined threshold temperature is determined, computer system 110 then compares the measured temperature 155 of food item 170 to the predetermined threshold temperature. If the measured temperature 155 of food item 170 is less than the predetermined threshold temperature, computer system 110 generates alert 160 to indicate the food temperature violation and may, in some embodiments, store a corresponding food safety violation in temperature log 118.

Second, certain embodiments generate alert 160 for display on user device 120 or electronic display 111 when computer system 110 determines from temperatures 155 that food temperature probe 150 was not properly cleaned between the probing of two different food items 170. To determine whether food temperature probe 150 was properly cleaned between probing of two different food items 170, certain embodiments of computer system 110 receive a first temperature 155 associated with a first food item 170A, receive a second temperature 155 associated with a second food item 170B, and receive a third temperature 155 associated with a cleaning of the food temperature probe 150. The third temperature 155 is measured by food temperature probe 150 after measuring the first temperature 155 but before measuring the second temperature 155. Computer system 110 then compares the third temperature 155 associated with the cleaning of the food temperature probe to cleaning threshold temperature 185. When the third temperature 155 associated with the cleaning of the food temperature probe is greater than cleaning threshold temperature 185, computer system 110 generates and sends an alert 160 to indicate that food temperature probe 150 was not properly cleaned between the probing of two different food items 170 and may, in some embodiments, store a corresponding food safety violation in temperature log 118.

In some embodiments, processor 110 additionally or alternatively determines that food temperature probe 150 was not properly cleaned between the probing of two different food items 170 by analyzing a rate of drop in temperatures measured by food temperature probe 150 between the probing of two different food items 170. As described above, cleaning solution 180 will generally cause a rapid fall in the temperatures measured by temperature probe 150. The fall in temperatures measured by temperature probe 150 due to cleaning solution 180 will be greater than any fall in temperatures caused by ambient air on temperature probe 150. Using this fact, computer system 100 may determine that temperature probe 150 was cleaned properly if food temperature probe 150 measures a certain temperature drop (e.g., 3° F. per second) for a certain amount of time (e.g., for at least three seconds) between the probing of two different food items 170. More specifically, computer system 110 may first receive a set of temperatures 155 measured by food temperature probe 150 after measuring a first temperature of a first food item 170A but before measuring a second temperature 155 of a second food item 170B. Computer system 110 then measures a rate of temperature drop from the received set of temperatures 155. For example, computer system 110 may determine that the set of temperatures 155 indicates a rate of temperature drop of 2° F. per second for two seconds. Computer system 110 then compares the determined rate of temperature drop to a predetermined rate of temperature drop. In this example, if the predetermined rate of temperature drop is 3° F. or more per second for at least three seconds, computer system 110 determines that the actual rate of temperature drop is less than the predetermined rate of temperature drop and proceeds to send alert 160 to indicate that food temperature probe 150 was not cleaned properly between the probing of two different food items 170. Computer system 110 may also, in some embodiments, store a corresponding food safety violation in temperature log 118. If, however, the actual rate of temperature drop is greater than or equal to the predetermined rate of temperature drop, computer system 110 determines that food temperature probe 150 was properly cleaned between the probing of two different food items 170 and thus does not generate alert 160.

To reduce or eliminate altogether the manual logging of food temperatures by food handlers, computer system 110 stores temperatures 155 from food temperature probe 150 in a temperature log 118 and may provide temperature log 118 for display on user device 120 or electronic display 111. Temperature log 118 includes temperatures 155 associated with food items 170. In some embodiments, temperature log 118 may additionally include time stamps to indicate times that temperatures 155 were measured by food temperature probe 150.

In certain embodiments, user device 120 may receive temperatures 155 generated by food temperature probe 150 and use temperatures 155 to provide alerts 160 for display on user device 120. In these embodiments, food temperature probe 150 may directly communicate with user device 120 instead of with computer system 110. For example, in such embodiments, memory 114 of user device 120 may include instructions (e.g., temperature monitoring module 116) that, when executed by a processor 112 of user device 120, enable user device 120 to monitor temperatures 155 in order to provide alerts 160 for display on user device 120 based on temperatures 155, as described herein. For example, instructions stored in memory 114 of user device 120 may generate alert 160 for display on user device 120 when a measured temperature 155 of a certain food item 170 is below a predetermined threshold temperature.

FIG. 2 illustrates a method 200 for monitoring the cleaning of a food temperature probe, according to certain embodiments. In general, method 200 may be utilized by temperature monitoring module 116 to automatically provide alert 160 for display on user device 120 or display 111. Method 200 may begin at operation 210 where method 200 receives a temperature associated with a first food item. In some embodiments, the temperature of the first food item is measured by a food temperature probe such as food temperature probe 150. In some embodiments, the first food item is food item 170A.

At operation 220, method 200 determines whether a temperature associated with a cleaning of the food temperature probe has been received. In some embodiments, the temperature associated with the cleaning of the food temperature probe is the result of the food temperature probe being cleaned with a cleaning solution such as cleaning solution 180. The temperature associated with the cleaning of the food temperature probe is measured by the food temperature probe after measuring the temperature of the first food item of operation 210 but before measuring the temperature of the second food item of step 230. If a temperature associated with a cleaning of the food temperature probe is received at operation 220, method 200 proceeds to operation 230. Otherwise, if a temperature associated with a cleaning of the food temperature probe is not received at operation 220 before a temperature associated with a second food item is received at operation 230, method 200 proceeds to operation 222.

At operation 220, method 200 sends an alert for display on a user device or other display in order to indicate that that the food temperature probe was not cleaned after the probing of the first food item. In some embodiments, the alert is alert 160. In some embodiments, the alert is displayed on a user device such as user device 120 or any other electronic display such as display 111. After operation 222, method 200 proceeds to operation 224.

At operation 224, method 200 determines whether a temperature associated with a second food item is received (e.g., an upward temperature spike). In some embodiments, the second food item is food item 170B. In some embodiments, the second food item is a different type of food from the first food item. If method 200 determines in operation 224 that a temperature associated with a second food item has been received, method 200 proceeds to operation 226. Otherwise, if method 200 determines in operation 224 that a temperature associated with a second food item has not been received, method 200 may end.

At operation 226, method 200 logs a food safety violation to indicate that the temperature probe was not cleaned between the probing of two different food items. In some embodiments, method 200 stores a corresponding food safety violation in a log such as temperature log 118. After operation 226, method 200 proceeds to operation 228 where method 200 sends an alert for display on a user device or other display. The alert may indicate that the second food item should be disposed and may include an instruction to clean the temperature probe prior to any additional probing. After operation 228, method 200 may end.

At operation 230, method 200 receives a temperature associated with a second food item. In some embodiments, the temperature of the second food item is measured by a food temperature probe such as food temperature probe 150. In some embodiments, the second food item is food item 170B. In some embodiments, the second food item is a different type of food from the first food item.

At operation 240, method 200 stores a cleaning threshold temperature in one or more memory units such as memory 114. In some embodiments, the cleaning threshold temperature is cleaning threshold temperature 185. The cleaning threshold temperature may be a known temperature associated with the cleaning solution being applied to the food temperature probe (e.g., 50° F.), or the cleaning threshold temperature may be a temperature that is a predetermined amount of temperature drop (e.g., 80 degrees) below the temperature of the first food item of operation 210. For example, if the measured temperature of the first food item of operation 210 is 140° F. and the preset threshold is set to a drop of 80° F. from the measured temperature of the first food item, the cleaning threshold temperature may be set to 60° F. (i.e., 140° F.–80° F.=60° F.).

At operation 250, method 200 determines whether the temperature associated with the cleaning of the food temperature probe of operation 220 is greater than the cleaning threshold temperature of operation 240. If method 200 determines that the temperature associated with the cleaning of the food temperature probe is greater than the cleaning threshold temperature, method 200 determines that the food temperature probe was not cleaned properly between the probing of the first and second food items and proceeds to operation 260. If method 200 determines that the temperature associated with the cleaning of the food temperature probe is less than or equal to the cleaning threshold temperature, method 200 determines that the food temperature probe was cleaned properly between the probing of the first and second food items and proceeds to the end of method 200.

At operation 260, method 200 logs a food safety violation to indicate that the temperature probe was not cleaned properly between the probing of two different food items. In some embodiments, method 200 stores a corresponding food safety violation in a log such as temperature log 118. After operation 260, method 200 proceeds to operation 265.

At operation 265, method 200 sends an alert for display on a user device or other display in order to indicate that that the food temperature probe was not cleaned properly between the probing of the first and second food items. In some embodiments, the alert is alert 160. In some embodiments, the alert is displayed on a user device such as user device 120 or any other electronic display such as display 111. After operation 265, method 200 may end.

Modifications, additions, or omissions may be made to the methods described herein without departing from the scope of the disclosure. The methods may include more, fewer, or other operations. Additionally, operations may be performed in any suitable order. That is, the operations of any method disclosed herein do not have to be performed in the exact order disclosed, unless explicitly stated.

As used in this document, "each" refers to each member of a set or each member of a subset of a set. Furthermore, as used in the document "or" is not necessarily exclusive and, unless expressly indicated otherwise, can be inclusive in certain embodiments and can be understood to mean "and/or." Similarly, as used in this document "and" is not necessarily inclusive and, unless expressly indicated otherwise, can be inclusive in certain embodiments and can be understood to mean "and/or." All references to "a/an/the element, apparatus, component, means, step, etc." are to be interpreted openly as referring to at least one instance of the element, apparatus, component, means, step, etc., unless explicitly stated otherwise.

Furthermore, reference to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The embodiments disclosed herein are only examples, and the scope of this disclosure is not limited to them. Particular embodiments may include all, some, or none of the components, elements, features, functions, operations, or steps of the embodiments disclosed herein. Certain embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
   one or more memory units configured to store a cleaning threshold temperature; and
   a processor configured to:
   receive, from a food temperature probe, a first temperature associated with a first food item;
   receive, from the food temperature probe, a second temperature associated with a second food item;
   receive, from the food temperature probe, a third temperature that was measured by the food temperature probe after measuring the first temperature but before measuring the second temperature, the third temperature associated with a cleaning of the food temperature probe; and
   send an alert for display on a user device when the third temperature is greater than the cleaning threshold temperature, wherein the cleaning threshold temperature comprises a temperature that is at least an 80 degree Fahrenheit temperature drop below the first temperature.

2. The system of claim 1, wherein the processor is further configured to:
   send a second alert for display on the user device when the first temperature is less than a minimum internal temperature associated with the first food item; and send a third alert for display on the user device when the second temperature is less than a minimum internal temperature associated with the second food item.

3. The system of claim 1, wherein the food temperature probe comprises a Bluetooth transceiver that wirelessly transmits temperatures.

4. The system of claim 1, wherein:
the food temperature probe is an Internet-of-Things device;
the food temperature probe wirelessly transmits temperatures to a gateway using an Internet-of-Things communications protocol; and
the gateway transmits the temperatures to the system over a communications network.

5. The system of claim 1, the processor further configured to store a food safety violation in the one or more memory units when it is determined that the third temperature associated with the cleaning of the food temperature probe is greater than the cleaning threshold temperature.

6. The system of claim 1, the processor further configured to generate a temperature log for display on the user device, the temperature log comprising the first, second, and third temperatures.

7. The system of claim 1, wherein the cleaning threshold temperature a known temperature associated with a cleaning solution to be applied to a food temperature probe.

8. The system of claim 1, wherein the processor is further configured to:
determine, from a plurality of temperatures measured by the food temperature probe after measuring the first temperature but before measuring the second temperature, a rate of temperature drop; and
send the alert for display on the user device when the determined rate of temperature drop is less than a predetermined rate of temperature drop.

9. The system of claim 1, wherein the first food item is a different type of food than the second food item.

* * * * *